(12) United States Patent
Gyorgyi

(10) Patent No.: US 8,400,008 B2
(45) Date of Patent: Mar. 19, 2013

(54) WIND TURBINE WITH VERTICAL AXIS AND WIND POWER PLANT

(76) Inventor: Viktor Gyorgyi, Felcsut (HU)

( * ) Notice: Subject to any disclaimer, the term of this patent is extended or adjusted under 35 U.S.C. 154(b) by 71 days.

(21) Appl. No.: 12/740,653

(22) PCT Filed: Oct. 30, 2008

(86) PCT No.: PCT/HU2008/000128
§ 371 (c)(1),
(2), (4) Date: Jul. 2, 2010

(87) PCT Pub. No.: WO2009/056896
PCT Pub. Date: May 7, 2009

(65) Prior Publication Data
US 2010/0308597 A1    Dec. 9, 2010

(30) Foreign Application Priority Data
Oct. 30, 2007   (HU) ..................... 0700705

(51) Int. Cl.
*F03D 9/00* (2006.01)
*H02P 9/04* (2006.01)
(52) U.S. Cl. ....................................... 290/55
(58) Field of Classification Search .......... 290/44, 290/55; 415/4.1, 4.2, 4.5, 2.1; 416/111, 416/117, 119
See application file for complete search history.

(56) References Cited

U.S. PATENT DOCUMENTS

| | | | | | |
|---|---|---|---|---|---|
| 3,920,354 | A | * | 11/1975 | Decker | 416/117 |
| 4,113,408 | A | * | 9/1978 | Wurtz et al. | 416/17 |
| 4,649,284 | A | * | 3/1987 | Hsech-Pen | 290/55 |
| 5,057,696 | A | * | 10/1991 | Thomas | 290/44 |
| 5,380,149 | A | * | 1/1995 | Valsamidis | 415/2.1 |
| 5,463,257 | A | * | 10/1995 | Yea | 290/55 |
| 5,525,037 | A | * | 6/1996 | Cummings | 416/117 |
| 6,015,258 | A | * | 1/2000 | Taylor | 415/4.4 |
| 6,191,496 | B1 | | 2/2001 | Elder | |
| 7,582,982 | B1 | * | 9/2009 | Deal | 290/55 |
| 7,946,802 | B1 | * | 5/2011 | Iskrenovic | 415/4.2 |
| 7,969,036 | B2 | * | 6/2011 | Chung | 290/55 |
| 8,057,159 | B2 | * | 11/2011 | Chong | 415/4.2 |
| 2003/0209911 | A1 | * | 11/2003 | Pechler | 290/55 |

FOREIGN PATENT DOCUMENTS

| | | |
|---|---|---|
| DE | 3928538 | 3/1991 |
| GB | 2275970 | 9/1994 |
| GB | 2378225 | 2/2003 |
| WO | 2006/089425 | 8/2006 |

\* cited by examiner

*Primary Examiner* — Julio Gonzalez
(74) *Attorney, Agent, or Firm* — Dowell & Dowell, PC

(57) ABSTRACT

A wind turbine having a rotor with a vertically oriented driven shaft for powering a generator and wherein the driven shaft in mounted between upper and lower bearings, and supporting rings perpendicularly attached in spaced relationship to the driven shaft, and a plurality of arcuate beams fitted with the rings and supporting turbine blades which are spaced inwardly of wind directing baffles that surround the rotor blades.

8 Claims, 8 Drawing Sheets

WIND TURBINE WITH VERTICAL AXIS AND WIND POWER PLANT

TECHNICAL FIELD OF THE INVENTION

The invention relates to a wind turbine with vertical axis, and a wind power plant.

BACKGROUND ART

A rising number of solutions having specific embodiments and performance being disclosed in the art, which intend to exploit and convert the energy of the streaming air into other type of energy. In fact it is intended to convert into electric or other type of energy—the most widely known systems are for example those used for pumping or heating water.

In the framework of the alternative energy programs the more effective exploitation of the wind energy becomes more and more considerable worldwide. The wind turbines having horizontal axis are the most widely spread constructions primarily in the case of a great performance demand; constructions having three blades are most frequently used, operation of which is well known in the art.

A disadvantage of the latter is that its effective operation may be achieved in great heights only, due to the highest speed of the wind in these levels.

Further disadvantage is due to a feature involving a constant need to orientate the plane of the blades always perpendicularly to the velocity vector of the wind and to change the angle of blades, in order to obtain the optimal and effective energy producing level.

Such a multidirectional movement makes great demands upon the system, that is the adequate technical requirements can be met by very expensive solutions only.

A further disadvantage of such a wind turbine system is that its construction requires a high quantity of materials to be located at great heights as well.

Wind turbines with horizontal axis can exploit the energy to be converted in a surface defined by its plane of blades only.

Furthermore, these systems can exploit the wind energy effectively in a narrow range of wind speed only.

To overcome these disadvantages of the systems with horizontal axis many solutions have been proposed in the art using wind turbines with vertical axis.

Such type of solutions is disclosed for example in the patent documents U.S. Pat. No. 4,365,929, U.S. Pat. No. 6,749,393, US2005079054, DE4122919, JP2006037898 and DE102005041600. Common disadvantage of these solution is that their construction is very complicated and expensive.

The main aspect of the present invention is to provide a wind turbine having vertical axis on the basis of the theoretical solutions of a new mathematical concept relating to the energetic system of fluid mechanics.

Therefore, the object of the present invention is to provide a wind power plant operating always in the same manner, in contrast with the prior art plants, without a feed-back regulation and independently of actual wind direction, and having a minimum flow resistance—that is having a high effectiveness—due to a balance between the torques affected on the inlet and outlet sides of the plant and to its novel geometrical configuration, and having a simple construction and a low cost of maintenance, and further having an ability to work effectively even in weak wind circumstances and sites, and being insusceptible to both sudden changes and distribution of wind load as a function of height.

DISCLOSURE OF THE INVENTION

The object of the present invention is achieved by providing a wind turbine with vertical axis, having a rotor and a generator connected with said axis, and a supporting structure holding the axis of said rotor by means of bearings, and said rotor consists of an axis fitted with an upper bearing mounted in an upper part of an upper console and with a lower bearing mounted in a building formed along the ground level, and supporting rings perpendicularly attached to the axis spaced apart along said axis, and a plurality of arcuate beams fitted with said rings and supporting turbine blades, and wherein there is a wind passage formed between edges placed on the inner diameter of the adjacent blades, and said passage having a size depending on the geometrical configuration of the turbine blades and that of the baffle means surrounding said rotor.

The wind turbine according to the invention preferably has at least two arcuate beams, and said turbine blades are formed as a shape determined by at least one quadric and/or trigonometric and/or hyperbolic mathematical curve.

Furthermore, the plane of an arcuate beam is advantageously perpendicular to the generatrices of said turbine blade, and an optional number of parting vanes are arranged in a plane perpendicular to the generatrices of said turbine blades.

The wind turbine preferably comprises baffle means having deflecting and supporting elements as efficiency enhancers arranged between inner diameter and outer diameter thereof, the number of which is equal to the number of said baffle means, and said efficiency enhancers form a closed polygon, and the supporting structure is formed by tubes or rolled shape pieces known in itself, and it is arranged in a plurality of planes perpendicular to the axis.

The wind turbine more preferably contains a supporting roller runway arranged along said axis and between the outer diameter of the rotor (F) and the inner diameter of the baffle means, and the runway (G) consists of a supporting ring formed on the baffle means and contacted to a race ring arranged on the outer diameter of the rotor.

Twin vanes having shorter arc length are arranged symmetrically between said turbine blades at the outer diameter of the rotor, and its number is equal to the number of turbine blades, and whirl triggers delimited by four surfaces are arranged in the same plane as said efficiency enhancers.

The object of the present invention is achieved also by providing a wind turbine with vertical axis, having a rotor and a generator connected with said axis, and it can be built with an optional height, and floors are formed spaced apart with equal distances along said height, and rotors consisting of supporting rings fixed spaced apart and having arcuate beams supporting turbine blades are arranged between said floors, and the axes of rotor(s) are bearing fitted in a hole of said floor.

Said floor preferably has a shape of a cylindrical disc, or a shape of an ellipsoid.

Said floor and said baffle means are made of light constructed armoured concrete.

The wind turbine advantageously comprises resilient members compensating different motions of parts of its axis, resulting in an even rotation.

DETAILED DESCRIPTION OF PREFERRED EMBODIMENTS

Figure 1:
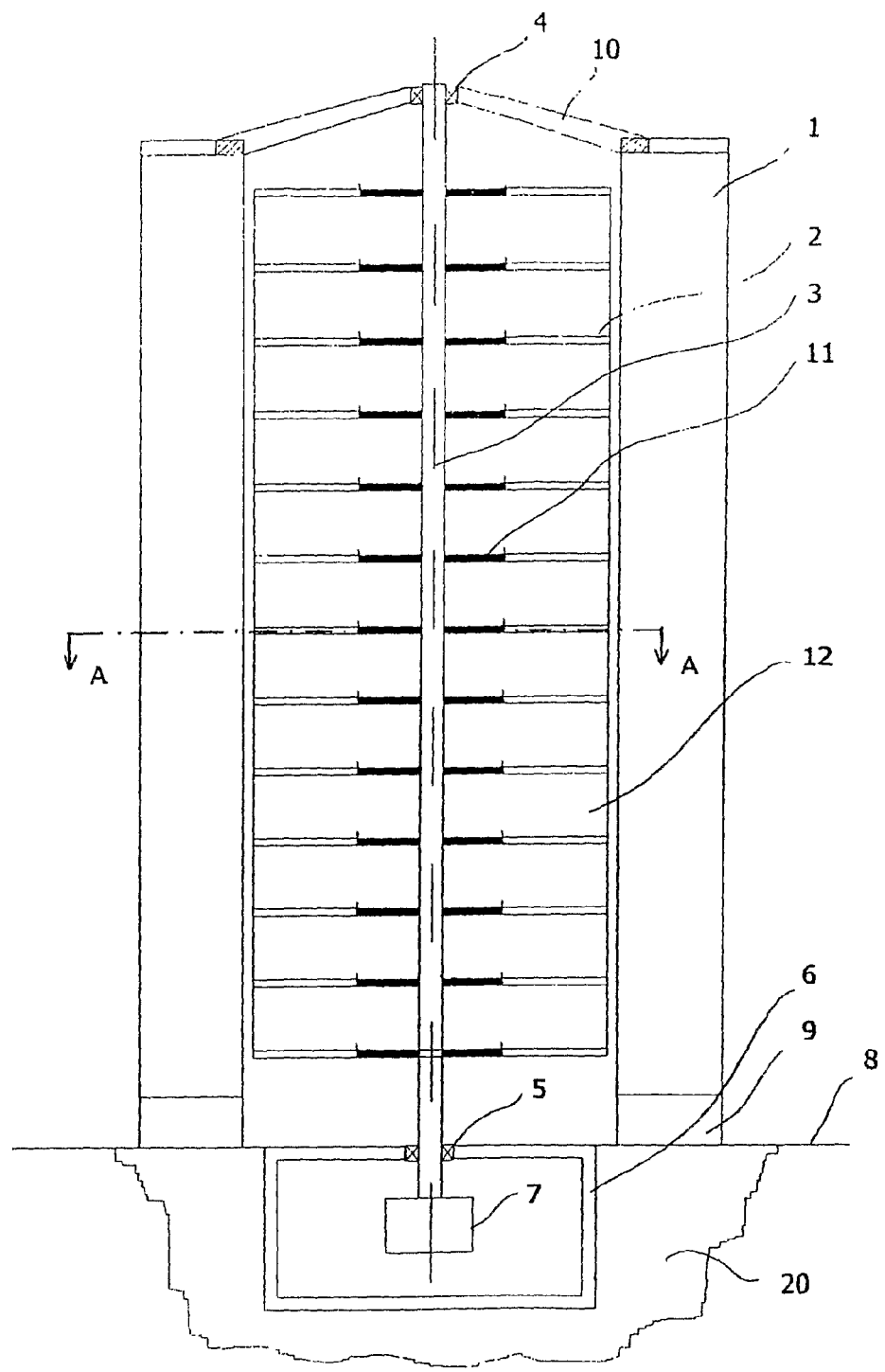
FIG. 1. is a vertical sectional view of the wind turbine with vertical axis according to the invention, FIG. 2. a sectional view taken along the plane A-A of FIG. 1., FIG. 3. is a perspective side view of the second embodiment of the wind turbine with vertical axis according to the invention FIG. 4. a sectional view taken along the plane A-A of FIG. 3., FIG. 5. a sectional view taken along the plane B-B of FIG. 4., FIG. 6. is a top side view of whirl triggers of the wind turbine with vertical axis according to the invention, FIG. 7. is a perspective view of a whirl trigger showed in FIG. 6., FIG. 8. is a perspective side view of the third embodiment of the wind turbine with vertical axis according to the invention, FIG. 9. a sectional view of the wind turbine in FIG. 8., taken along the plane C-C, FIG. 10. a sectional view of the wind turbine in FIG. 9., taken along the plane D-D, FIG. 11. is a schematic operational diagram of the wind turbine according to the invention.

FIG. 1. is a vertical sectional view of the wind turbine with vertical axis according to the invention, where the wind turbine is supported by the ground 8 level. Central control station and devices to operate the wind turbine are located in a building 20 arranged along the ground 8 level.

A base element 9 supporting the upper machinery of the wind turbine is arranged on the ground 8 level, and said upper machinery is topped by an upper console 10.

The axis or vertical driven shaft 3 of the wind turbine is held by a bearing 4 of the upper console 10 and a bearing 5 fixed in the building 20, and connected to a generator 7 arranged in the building 7 in manner known itself, so that the generator 7 is driven by the driven shaft 3.

Baffle means 1 adapted also for vertical load bearing are placed on the base element 9 arranged on the ground 8 level. Baffle means 1 are fixedly attached to the base element 9. Upper ends of the baffle means 1 are rigidly cross braced by the upper consoles 10.

Supporting rings 11 having a diameter $d_1$ are placed on the axis 3 held by a bearing 4 of the upper console 10 and a bearing 5 fixed in the building 20, preferably spaced apart by equal distances along said axis 3 and parallelly to each other, and their mounting plane is perpendicular to said axis 3. (see FIGS. 1. and 3.)

Figure 2:
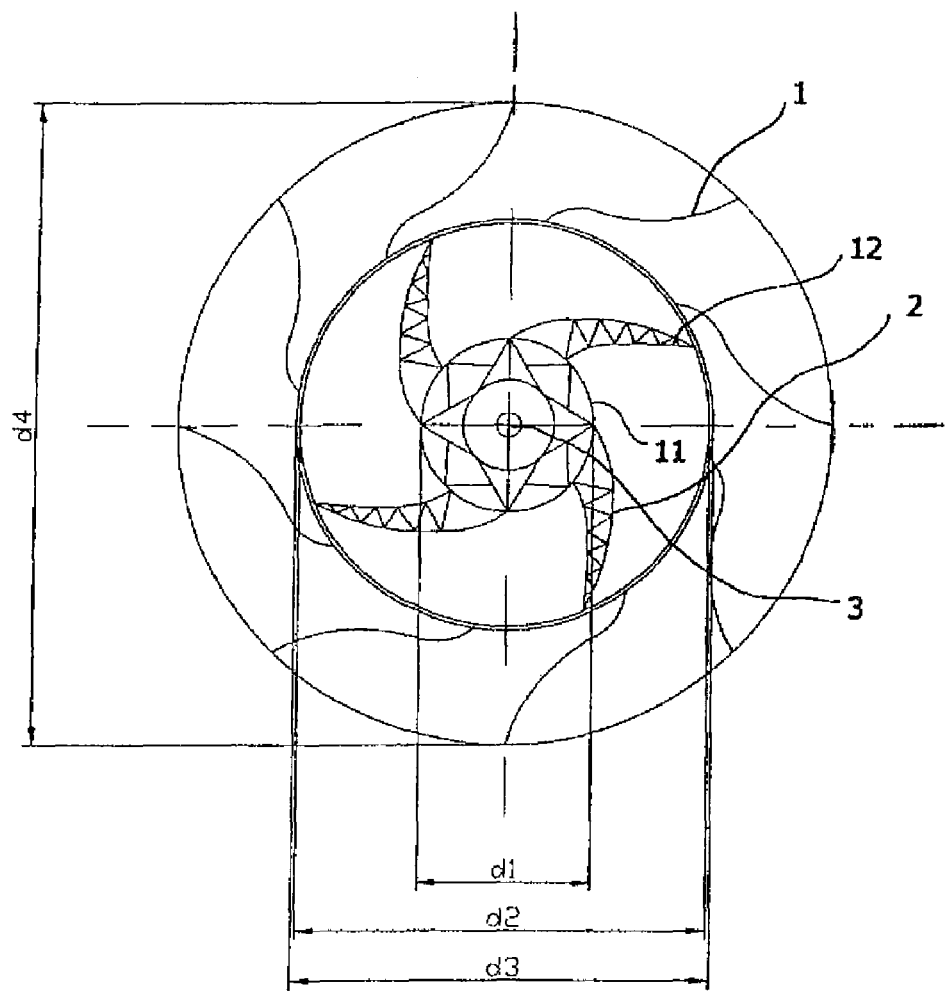

Arcuate beams 2 supporting and fixing turbine blades 12 are clamped to supporting rings 11 mounted on the axis 3. (FIG. 2.)

The number of the turbine blades 12 and that of the arcuate beams 2 attached thereto is arbitrary, but at least two are necessary.

The surface of the turbine blades 12 are formed as a shape determined by at least one quadric and/or trigonometric and/or hyperbolic mathematical curve.

The axis 3 with the supporting rings 11 mounted thereon and holding the arcuate beams 2 provided with turbine blades 12 form a single unit that is the rotor F, and these elements in operation rotate at the same rotational speed.

Arcuate beam 2 and supporting ring 11 provided on the axis 3 have a construction having a structure known itself, for example of a grid structure made of aluminium or plastic material.

The turbine blade 12 is arranged on the arcuate beam 2 so that its generatrices are adjoining the inner part of the arcuate beam 2.

There is a wind passage S formed between edges placed on the inner diameter $d_1$ of the adjacent blades 12, and said passage S has a size depending on the geometrical configuration of the turbine blades 12 and that of the baffle means 1 surrounding said rotor F.

Figure 3:
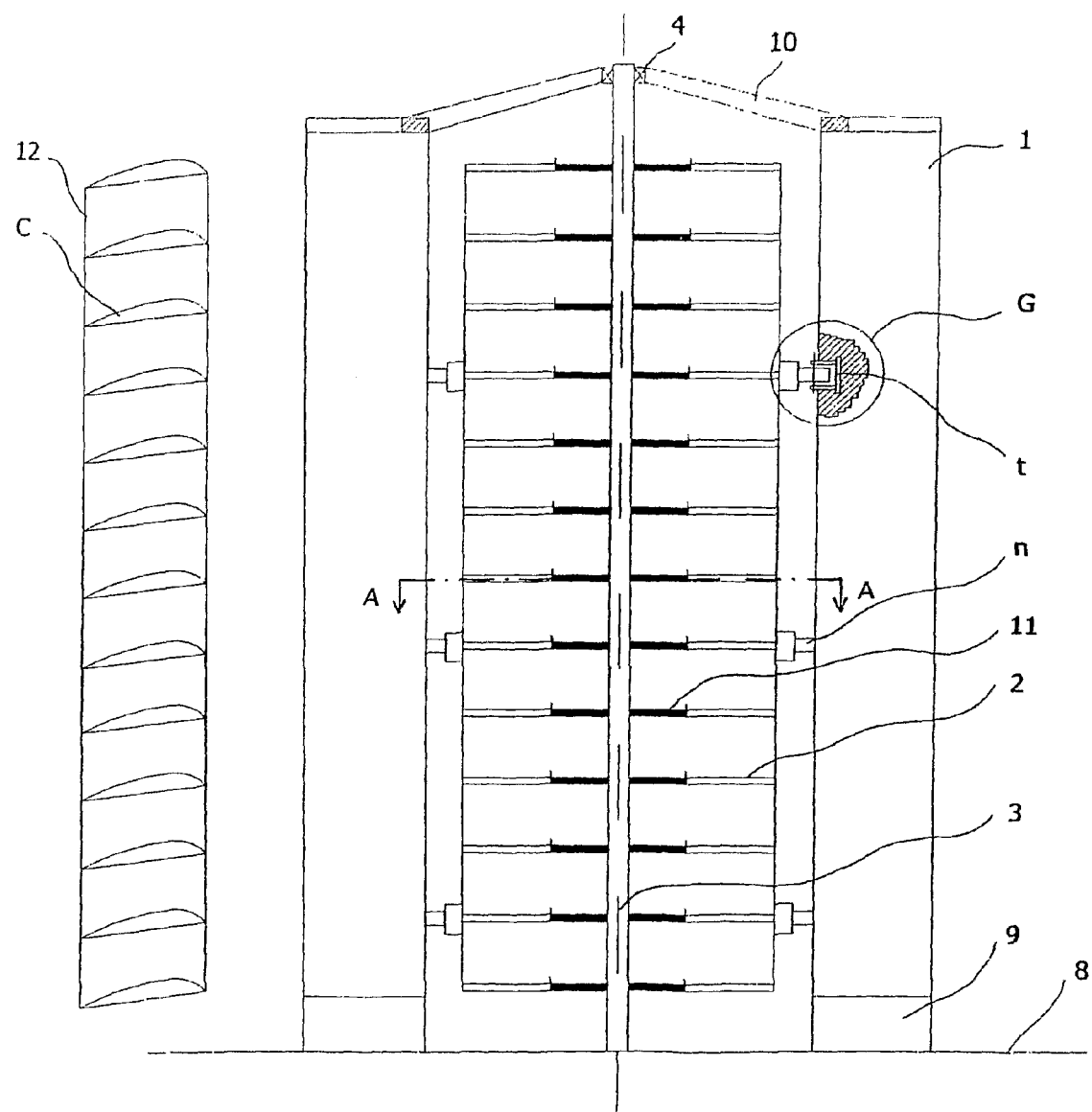

It is to be noted, that in case of high performance wind turbines an arbitrary number of parting vanes C might be arranged in a plane perpendicular to the generatrices of the turbine blades 12, and said vanes C have a plane perpendicular to the generatrices of the blades 12. (FIG. 3.)

The diameters of each component are very important factors. Inner arcs of baffle means 1 start in a diameter $d_3$ being larger than the diameter $d_2$ of the turbine blades 12.

Viewing perpendicularly to the generatrices of the baffle means 1 there are located concave and convex arcs.

The outermost points of the arcs of the baffle means 1 are arranged in a circle having a diameter $d_4$.

Baffle means 1 are positioned vertically and symmetrically spaced apart with equal angles therebetween.

In case of a wind turbine having less performance the construction of the baffle means 1 is formed by a grid structure having a vertical sheet covering and its material can be selected optionally.

There is a strict mathematical function between the diameter $d_2$ of the rotor F as well as the outer $d_3$ and inner $d_4$ diameters of the baffle means 1, determined by the wind speed and the performance rating of the wind turbine. In case of a relatively lower wind speed it is advantageous to choose the diameter $d_4$ of the baffle means 1 greater and the diameters $d_2$ and $d_3$ lesser, since the incoming air volume will be greater in this case albeit that the number of baffle means remains, and the same volume as the incoming air volume must enter between the turbine blades 12 having reduced diameter $d_2$. Because of the equation of continuity these two volumes must be equal, a much greater entering air speed can be obtained at diameter $d_3$, resulted in a kinetic energy raised in a quadratic ratio. One of the most advantageous effects of the present invention in comparison of the prior art solutions is its effective feasibility and applicability also under low wind circumstances.

Figure 11:
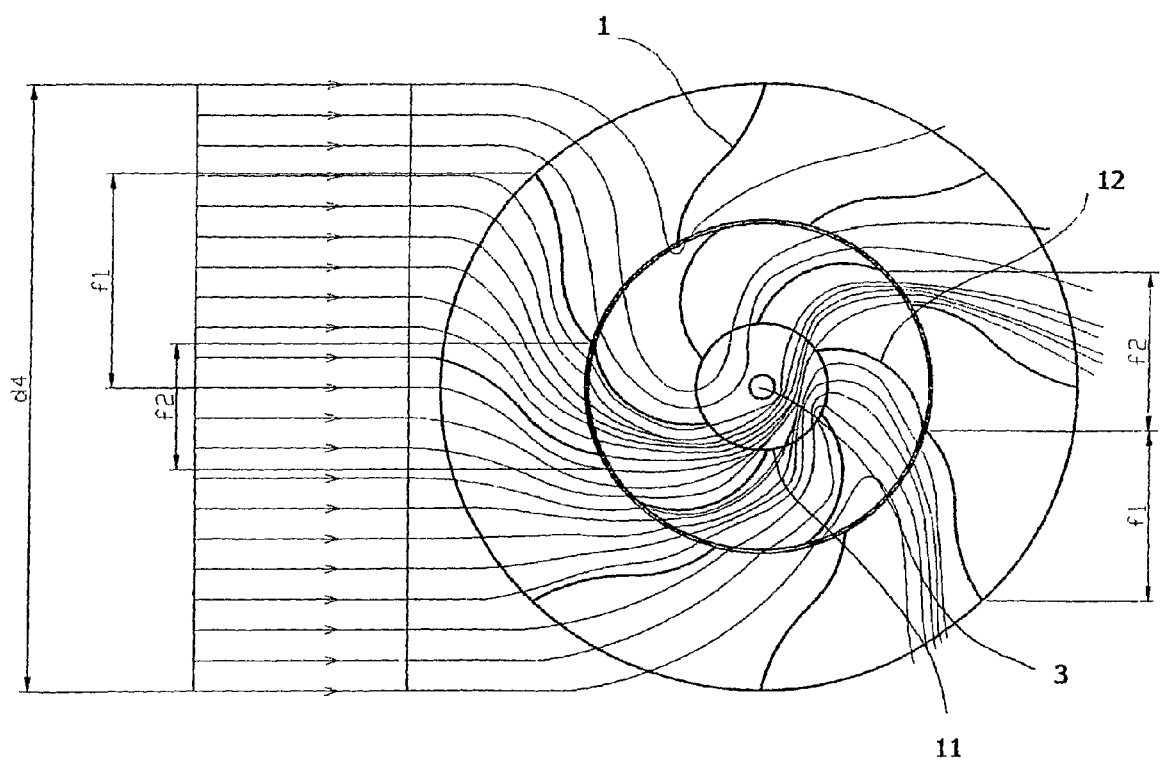

Operation of the wind turbine according to the invention will be described later in details in reference of FIG. 11.

FIG. 2. shows a high power embodiment of the wind turbine with vertical axis disclosed in relation of FIG. 1. according to the invention.

Figure 4:
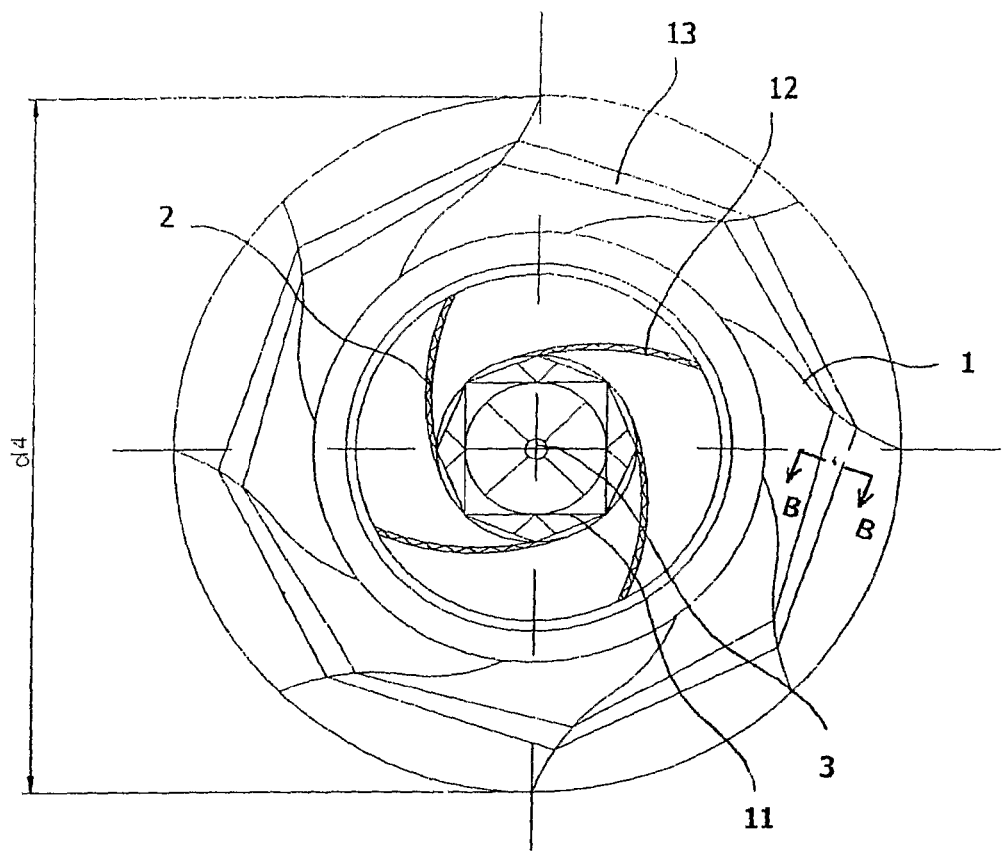

The solution depicted in FIG. 4. contains eight baffle means 1 and efficiency enhancers 13—baffle and supporting means in itself as well—arranged along a diameter less than diameter $d_4$ but larger than diameter $d_3$ of the baffle means 1.

Efficiency enhancers 13 form a closed polygon according to the number of baffle means 1, increasing the construction's strength and efficiency.

The corners of the polygon of efficiency enhancers 13 adjoin the side surface of the baffle means 1 perpendicularly to the generatrices of the baffle means 1.

Figure 5:
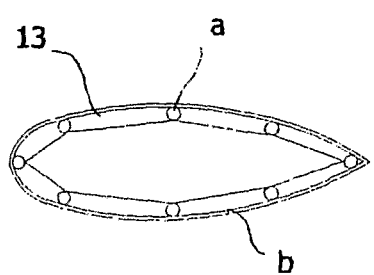

A preferred embodiment of the efficiency enhancer 13 is shown in FIG. 5.

Efficiency enhancer 13 has a framework comprising tubes or section profiles known in itself, which are attached to two adjacent baffle means 1 preferably by means of welded joints.

The framework of the efficiency enhancer 13 includes supporting elements a surrounded by a casing b, where the number of supporting elements a is preferably eight, although this number may optionally be chosen.

Longitudinal structural elements and generatrices of casing b of the efficiency enhancer 13 are placed in planes being perpendicular to the shell of the baffle means 1. (FIG. 4.)

Each supporting element a of the efficiency enhancer 13 is perpendicular to the baffle means 1 and is arranged parallelly to the plane of the supporting ring 11 and arcuate beam 2, therefore it is advantageous to arrange the efficiency enhancer 13 in the plane of the supporting ring 11 and arcuate beam 2.

Optional number of efficiency enhancers 13 may be mounted parallelly to each other in the baffle means 1.

The material used to build the efficiency enhancers 13 is a function of the performance of the wind turbine, that is in case of higher demand of performance the efficiency enhancers 13 are made of steel reinforced concrete, like the baffle means 1.

In this embodiment a supporting roller cam G surface can be arranged between the outer diameter $d_2$ of the rotor F and the inner diameter $d_3$ of the baffle means 1 (FIG. 3.). Supporting roller cam G surfaces provide an accurate distance control between the outer diameter $d_2$ of the rotor F and the inner diameter $d_3$ of the baffle means 1 even in case of very long (high) rotors F and extreme wind load.

The number of supporting roller cam G surfaces to be built in along the rotor F will be determined by the expected load wind the and planned performance of the wind turbine.

In an embodiment according to FIG. 3. there are built three supporting roller cam G surfaces.

A base member of the supporting roller cam G surface is a supporting ring t supported by baffle means 1 and engaging a race ring n arranged on the outer periphery $d_2$ of the rotor F.

Figure 6:
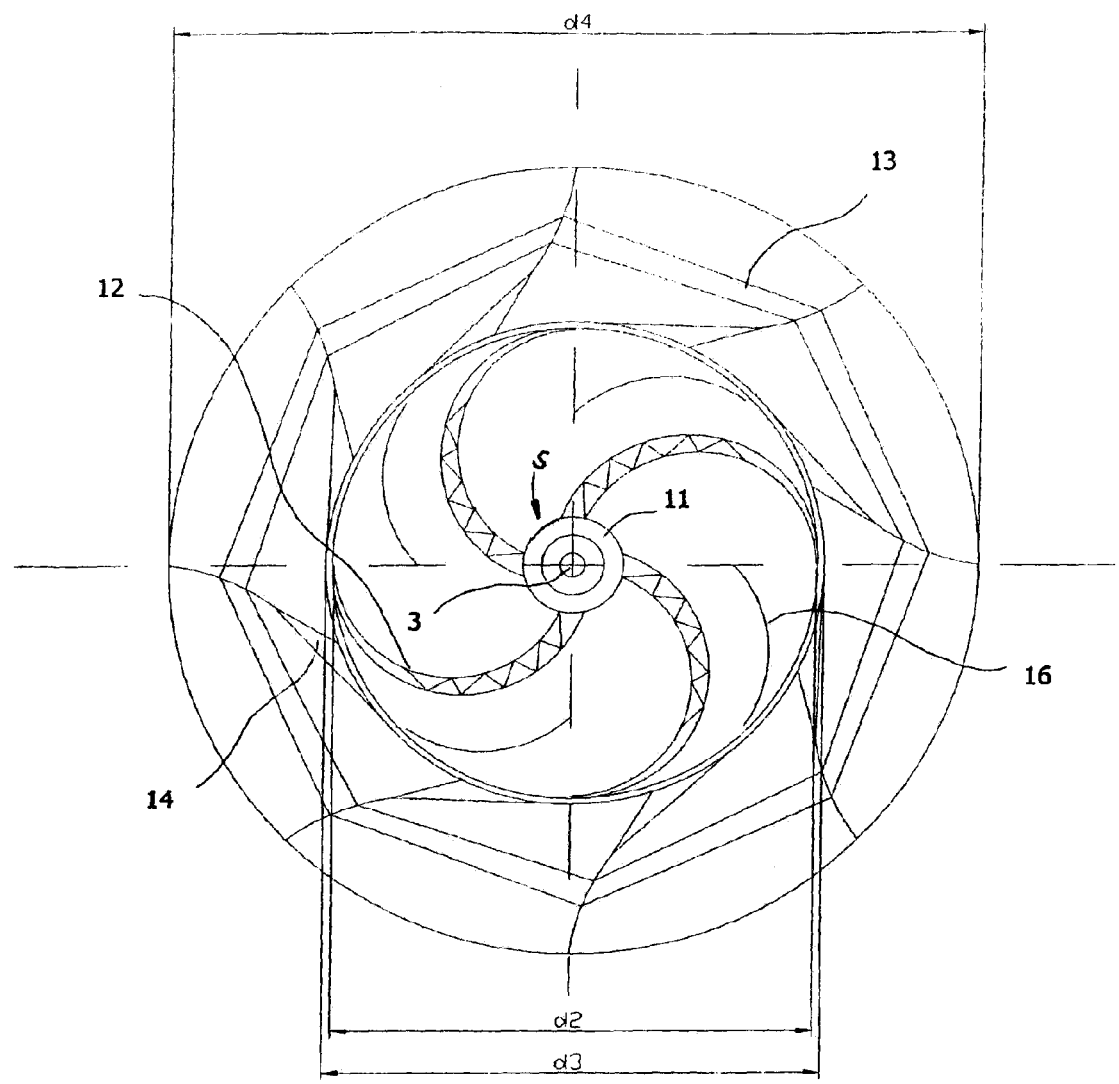

In an embodiment of a high power wind turbine shown in FIG. 6. twin vanes 16 having shorter arc length are arranged symmetrically between turbine blades 12. Arc length of the twin vanes 16 is shorter than the arc length of the turbine blades 12 and outermost generatrices running parallelly to the axis 3 of this vanes 16 are placed on the diameter $d_2$ of the rotor F, the number of the vanes 16 is equal to the number of turbine blades 12.

As mentioned above, in case of a high power wind turbine it is preferable to apply whirl triggers 14 on the baffle means 1 arranged perpendicularly to the axis 3 an in the same plane as the efficiency enhancers 13.

Figure 7:
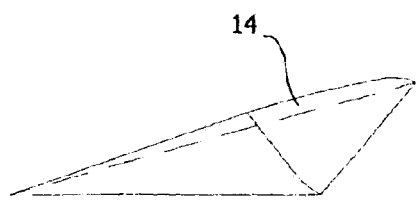
Figure 8:
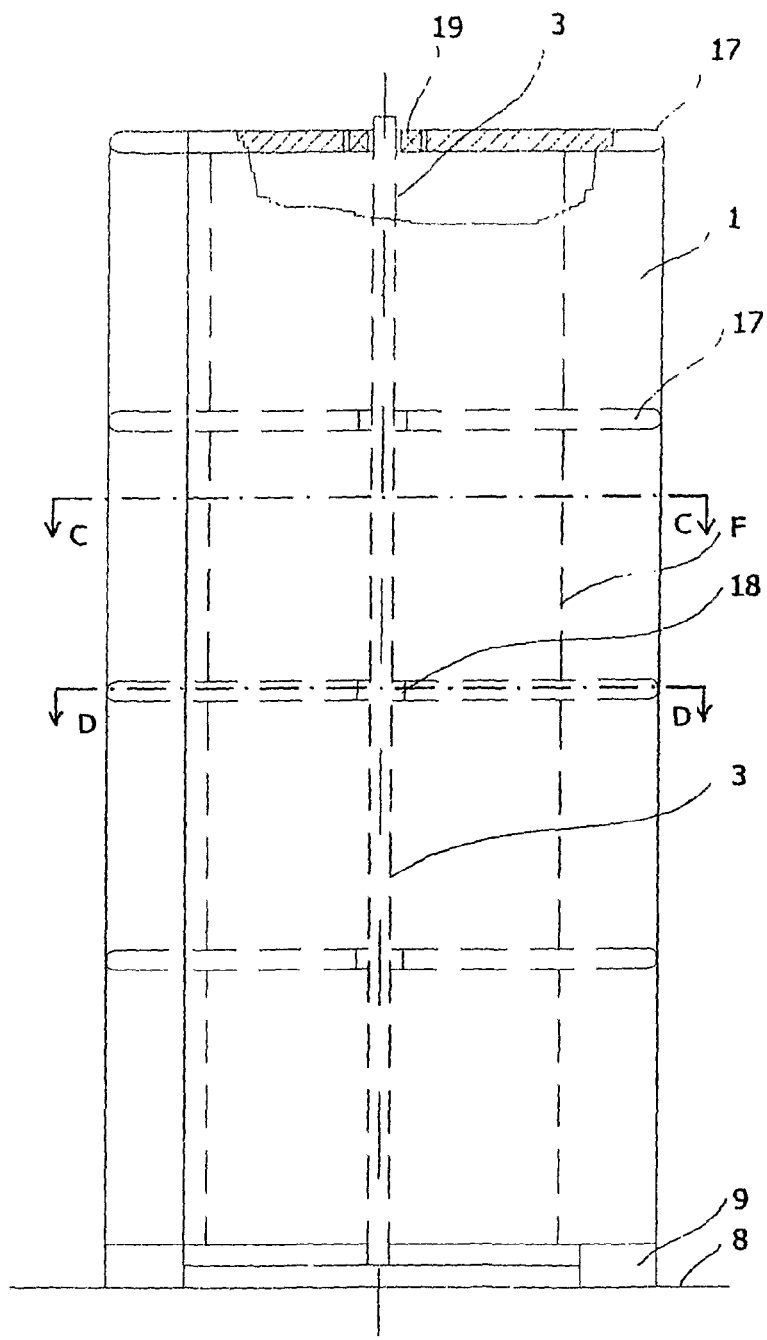

Whirl triggers 14 of this embodiment are depicted in FIG. 7. It is clearly shown in the figure, that a whirl trigger 14 is a body delimited by four surfaces.

The operation of the second embodiment is substantially equal to that of the embodiment shown in FIG. 1., except that the air flow moving between the turbine blades is modified by the efficiency enhancers 13 and whirl triggers 14, which results in an increased performance.

Figure 9:
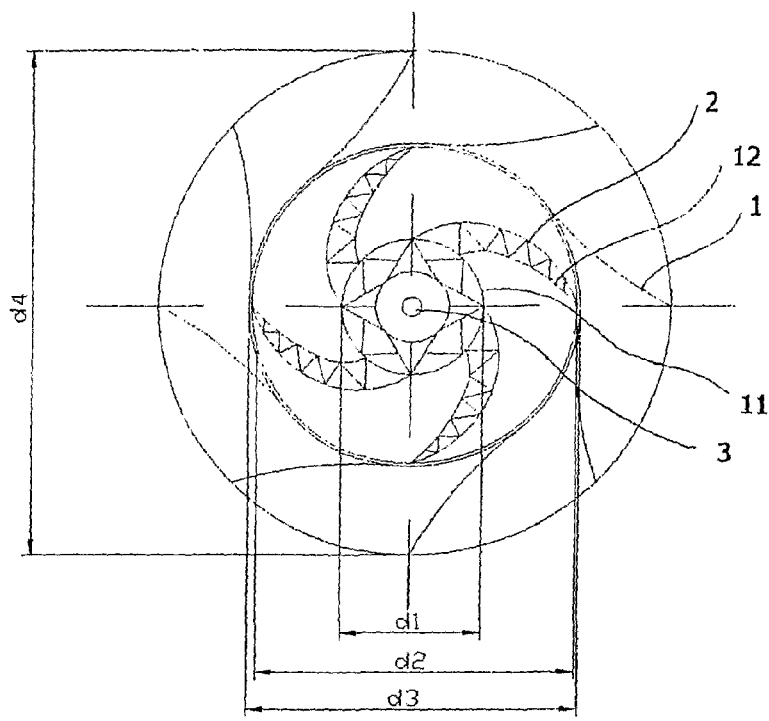

FIG. 9. depicts the structure of a wind turbine having an arbitrary performance.

The height of a wind turbine shall be determined by the dynamic stability. In this embodiment at least one retaining and dividing floor 17 is formed along a predetermined height of the baffle means 1 in order to achieve dynamic stability, made of a known constructional material, preferably of a material equal to the material of the baffle means 1. For high power wind plants, that os over 1 MW, this material is preferably steel reinforced concrete.

Retaining and dividing floors 17 might be arranged in an arbitrary number perpendicularly to the baffle means 1 and axis 3 as well, forming a construction being unitary as regards both to fluid dynamics and strength mechanics, the sizes of which is determined substantially by the size of the axis 3 and the outer diameter $d_4$ of the baffle means 1.

Floors 17 are spaced apart from each other by the same distance h determining also the length of the axis between the floors 17.

Wind turbine showed in FIGS. 1. and 2. is substantially placed between two floors 17 (see FIG. 9.), but it is possible to arrange different embodiments of wind turbines between two floors 17. The upper console 10 may be omitted in this case, indeed, since its role is taken up by floor 17.

Figure 10:
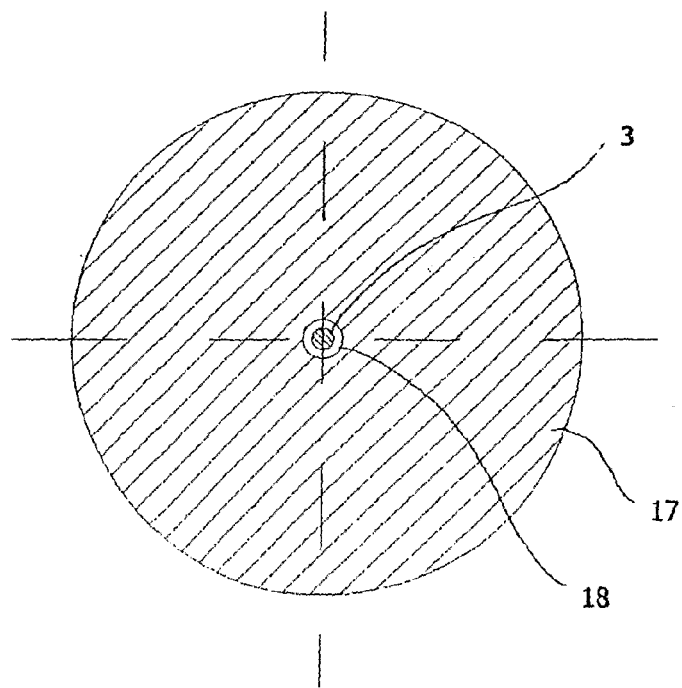

A floor 17 is shown in FIG. 10., having a through hole 18 in the middle and receiving the axis 3 preferably bearing fitted in the hole 18.

The floor 17 is preferably disc shaped, and advantageously it is formed as an ellipsoid of rotation or any other body suitable according to fluid dynamics. In this embodiment the height limit is determined by the length of the axis 3. For that very reason it is preferred to apply an axis 3 divided according to the distance h of the floors 17, but in this case the bearing arrangement requires a special structural construction, as follows.

Due to the floor 17 used on this embodiment more than one sections F1, F2, F3 ... Fn of the rotor F may be arranged along the overall height. Since the wind force affecting the turbine blades 12 arranged between two parallel floors 17 may be different, different air flowing circumstances must be taken into account between different floors 17. Having regard to this fact in planning, the axis 3 can be formed by sections F1, F2, F3 ... Fn according to distance h, so that a given section F1 shall be gear fitted in the central hole 18 formed in the respective upper floor 17, and the lower end of the section F1 shall be connected to the upper end of a lower section F2 preferably by means of an elastic coupling supporting the section F1 in axial direction, but allowing only a small lateral movement. In this embodiment, the bearing is fixed in the holes 18 by means of a resilient structural element. This way a flexural buckling of the axis 3 consisting of sections F1, F2, F3 ... Fn might be omitted even in case of a great wind load affecting differently along the height of the wind turbine.

Operation of the wind turbine with vertical axis 3 according to the invention will now be described in reference of FIG. 11.

The principal advantage of the wind turbine with vertical axis 3 according to the invention is that it can be used at every wind speed and the performance of the generator—i.e. hot water supply—increases along with increasing wind speed, and it has an earthquake proof construction.

An air mass arriving to a surface determined by the diameter $d_4$ and a respective height enters into the wind plant through openings $f_1$ determined by the baffle means 1. Entering air will be accelerated by both the curvature of the baffle means 1 and by the cross sectional area narrowing from an opening surface $f_1$ to an opening $f_2$ being smaller than surface $f_1$. The accelerated air mass having now increased speed and having, therefore, increased impulse enters the turbine blades 12 through opening $f_2$, exerts a torque to the rotor F while receiving a change of flow direction, and flows into the opposite turbine blades 12 through a passage S delimited by the axis 3 and supporting rings 11, where its impulse shall be changed and receiving a further change of flow direction exerts a further torque on the turbine blades 12.

Due to the arrangement of the system the curves and openings $f_1$, $f_2$ of the baffle means 1, as well as the diameter $d_2$ of rotor F and curves of the turbine blades 12 provide a laminar flow at every speed, and the torque obtained will be equal on the turbine blades 12 both in the inlet and outlet, therefore symmetrically exerted to the axis 3.

The openings of the baffle means 1 have an inverse behaviour at the outflow side, indeed, as compared to the inflow circumstances.

Spent air exiting the outflow side opening $f_2$ expands up to the opening $f_1$ having greater surface, then it will be carrying away by an air flow flowing freely beside the wind plant, which phenomenon decreases the flow resistance and increases the effectiveness of the wind turbine.

The main advantage of the wind power plant according to the present invention is that it provides a wind power plant operating always in the same manner, in contrast with the prior art plants, without a feed-back regulation and independently of actual wind direction, and having a minimum of flow resistance—that is having a high effectiveness—due to a balance between the torques affected on the inlet and outlet sides of the plant and to its novel geometrical configuration, and has a simple construction and a low cost of maintenance, and further has an ability to work effectively even in weak wind circumstances and sites, and being insusceptible to both sudden changes and distribution of wind load as a function of height.

The invention claimed is:

1. A wind turbine comprising, a vertically driven shaft (3), having a rotor (F) and a generator (7) connected with the driven shaft (3), and a supporting structure including upper and lower bearings for supporting the driven shaft (3) of the rotor (F), a plurality of supporting rings (11) perpendicularly attached to the driven shaft (3) so as to be spaced from one another, a plurality of arcuate beams (2) fitted with the rings (11) in a common plane therewith and supporting turbine blades (12), baffle means (1) having deflecting and supporting elements as efficiency enhancers (13) arranged between an inner diameter ($d_3$) and an outer diameter ($d_4$) thereof arranged around the rotor (F), a wind passage (S) formed between edges placed on the inner diameter ($d_1$) of adjacent blades (12), the turbine blades (12) are formed as a shape determined by at least one curve selected from a group of curves consisting of quadric, trigonometric and hyperbolic mathematical curves, a plurality of parting vanes (c) are arranged in a plane perpendicular to generatrices of the turbine blades (12), wherein a number of the efficiency enhancers (13) is equal to a number of the baffle means (1), the efficiency enhancers (13) form a closed polygon, and a support runway (G) mounted to the baffle means (1) surrounding the rotor (F) and including a ring (t) engaged by a race ring (n) extending from outer diameter ($d_2$) of the rotor (F).

2. The wind turbine of claim 1, including twin vanes (16) having shorter arc lengths than arc lengths of the turbine blades (12), the twin vanes (16) being arranged symmetrically between the turbine blades (12) at the outer diameter ($d_2$) of the rotor (F), and the number of twin blades (16) is equal to the number of turbine blades (12).

3. The wind turbine according to claim 2, including whirl triggers (14) having only four surfaces are arranged in a common plane as the efficiency enhancers (13).

4. The wind turbine as claimed in claim 1, including a plurality of vertically and equally spaced floors (17) along a height of the driven shaft (3), the supporting rings (11) being arranged between the floors (17), and the driven shaft (3) extending within bearings fitted in a hole (18) of each of the floors (17).

5. A wind turbine comprising, a vertically driven shaft (3), having a rotor (F) and a generator (7) connected with the driven shaft (3), and a supporting structure including upper and lower bearings for holding the driven shaft (3) of the rotor (F), a plurality of supporting rings (11) perpendicularly attached to the driven shaft (3) so as to be spaced from one another along the driven shaft (3), a plurality of arcuate beams (2) fitted with the rings (11) and supporting turbine blades (12), baffle means (1) arranged around the rotor (F) to form wind passages toward the adjacent blades (12), and the passages having a size depending on a geometrical configuration of the turbine blades (12) and size of the baffle means (1) surrounding the rotor (F), the turbine blades (12) are formed so as to form at least one curve having a shape selected from a group of curves consisting of quadric, trigonometric and hyperbolic mathematical curves, and a plurality of parting vanes (c) are arranged in a plane perpendicular to a generatrices of the turbine blades (12), the baffle means (1) have deflecting and supporting elements thereon functioning as efficiency enhancers (13) arranged between an inner diameter ($d_3$) and an outer diameter ($d_4$) thereof, at least one supporting roller runway (G) arranged along the driven shaft (3) and between an outer diameter ($d_2$) of the rotor (F) and an inner diameter ($d_3$) of the baffle means (1), and the runway (G) including a supporting ring (t) formed on the baffle means (1) and engaged by a race ring arranged on the outer diameter ($d_2$) of the rotor (F).

6. The wind turbine of claim 5, including twin vanes (16) having shorter arc lengths than arc lengths of the turbine blades (12), the twin vanes (16) being arranged symmetrically between the turbine blades (12) at the outer diameter ($d_2$) of the rotor (F), and the number of twin blades (16) is equal to the number of turbine blades (12).

7. The wind turbine according to claim 6, including whirl triggers (14) having only four surfaces are arranged in a common plane as the efficiency enhancers (13).

8. The wind turbine as claimed in claim 5, including a plurality of vertically and equally spaced floors (17) along a height of the driven shaft (3), the supporting rings (11) being arranged between the floors (17), and the driven shaft (3) extending within bearings fitted in a hole (18) of each of the floors (17).

* * * * *